United States Patent
Kim et al.

(10) Patent No.: US 7,528,807 B2
(45) Date of Patent: May 5, 2009

(54) POWER SUPPLY AND DRIVING METHOD THEREOF AND APPARATUS AND METHOD FOR DRIVING ELECTRO-LUMINESCENCE DISPLAY DEVICE USING THE SAME

(75) Inventors: Hyun Jeoung Kim, Daegu (KR); Hak Su Kim, Daegu (KR)

(73) Assignee: LG Electronics Inc., Seoul (KR)

( * ) Notice: Subject to any disclaimer, the term of this patent is extended or adjusted under 35 U.S.C. 154(b) by 900 days.

(21) Appl. No.: 10/900,354

(22) Filed: Jul. 28, 2004

(65) Prior Publication Data

US 2005/0052170 A1    Mar. 10, 2005

(30) Foreign Application Priority Data

Jul. 31, 2003 (KR) .................. 10-2003-0052979

(51) Int. Cl.
*G09G 3/30* (2006.01)

(52) U.S. Cl. .................. 345/76; 345/204; 345/211

(58) Field of Classification Search .................. 345/36, 345/42, 45–53, 76–77, 84, 94–95, 204, 208–214; 315/169.1, 169.3
See application file for complete search history.

(56) References Cited

U.S. PATENT DOCUMENTS 6,421,034 B1 *   7/2002   Mihara ................ 345/76
7,119,768 B2 *  10/2006   Yazawa et al. ........ 345/76
7,133,038 B2 *  11/2006   Park et al. .......... 345/211

FOREIGN PATENT DOCUMENTS

| JP | 07-123702 A | 5/1995 |
| JP | 07-163138 A | 6/1995 |
| JP | 63-039460 A | 2/1998 |
| JP | 2002-262545 A | 9/2002 |

* cited by examiner

*Primary Examiner*—Richard Hjerpe
*Assistant Examiner*—Mansour M Said
(74) *Attorney, Agent, or Firm*—Birch, Stewart, Kolasch & Birch, LLP

(57) ABSTRACT

The present invention relates to a power supply that is adaptive for improving energy conversion efficiency and a driving method thereof and an apparatus and method for driving an electroluminescence display device using the same. A power supply that supplies a driving power to drive a driving apparatus according to an embodiment of the present invention includes a power source to supply DC power; and a DC-DC converter to convert the DC power from the power source to a level of 1/N (provided that N is a positive integer of not less than 2) times the driving power, and then to convert the converted DC power of 1/N times to a level of the driving power.

18 Claims, 8 Drawing Sheets

VL

POWER SUPPLY AND DRIVING METHOD THEREOF AND APPARATUS AND METHOD FOR DRIVING ELECTRO-LUMINESCENCE DISPLAY DEVICE USING THE SAME

This application claims the benefit of the Korean Patent Application No. P2003-52979 filed on Jul. 31, 2003, which is hereby incorporated by reference.

BACKGROUND OF THE INVENTION

1. Field of the Invention

The present invention relates to a power supply and a driving method thereof and an apparatus and method for driving an electroluminescence display device using the same, and more particularly to a power supply that is adaptive for improving energy conversion efficiency and a driving method thereof and an apparatus and method for driving an electroluminescence display device using the same.

2. Description of the Related Art

Recently, the application of a power supply becomes more activated in factory automation equipments, office automation equipments, information devices, communication devices and power system, wherein the power supply is stable and capable of enabling them to be made smaller and lighter.

Generally, a switching power supply has two main parts of a rectifier to convert AC input into DC and a DC-DC converter to stabilize the DC input therefrom in regard to load fluctuation and the change of input voltage. A capacity input type of rectifying circuit, which is mainly used as a DC supply for various electronic devices, needs a capacitor of big capacity in order to reduce the burden of the device by restraining the input voltage fluctuation of the DC-DC converter.

Referring to FIG. 1, a prior art power supply and a driving apparatus using the same includes a voltage boosting type of DC-DC converter 10 to receive DC power source Vin for boosting it to a desired output voltage and a driving apparatus 20 to receive the boosted output voltage from the DC-DC converter 10 for being driven.

The voltage boosting type of DC-DC converter 10 controls the on/off ratio of a switching device (not shown) to boost the voltage of the DC power source Vin, thereby outputting the boosted DC power source Vin. At this moment, the voltage boosting type of DC-DC converter 10 uses a pulse width modulation method in case that the output current is high and a pulse frequency modulation method in case that the output current is low, in consideration of energy conversion efficiency.

Generally, a method by the voltage boosting type of DC-DC converter 10 has a disadvantage that it is not easy to be realized in real because the on/off ratio should be controlled on a large scale whether it is the pulse width modulation method or the pulse frequency modulation method in order to boost the output voltage more than three or four times in comparison with the input voltage. Further, the on/off ratio cannot be set to be more than 80% at maximum due to the energy conversion efficiency. Accordingly, the difference between the input voltage and the output voltage of the DC-DC converter 10 is around 5 times in design, but it is 4 times at maximum in real.

On the other hand, a DC-DC converter 10 that boosts voltage in a charge pump method where several capacitors are multitier-configured, is easy to be controlled arbitrarily in accordance with the design of the output voltage, but has many limits in output current. That is, in the charge pump type of DC-DC converter 10, the efficiency of the first tier is more than 90% in output, but the efficiency rapidly falls as it goes through several tiers.

SUMMARY OF THE INVENTION

Accordingly, it is an object of the present invention to provide a power supply that is adaptive for improving energy conversion efficiency and a driving method thereof and an apparatus and method for driving an electroluminescence display device using the same.

In order to achieve these and other objects of the invention, a power supply that supplies a driving power to drive a driving apparatus according to an aspect of the present invention includes a power source to supply a DC power; and a DC-DC converter to convert the DC power from the power source to a level of 1/N (provided that N is a positive integer of not less than 2) times the driving power.

The power supply further includes a square wave signal supplier to supply a square wave signal to the DC-DC converter; and a DC-DC controller that generates a second switching control signal for controlling the square wave signal supplier and in addition generates a first switching control signal synchronized with the second switching control signal.

In the power supply, the DC-DC converter includes a booster that converts the DC power to a level of 1/N (provided that N is a positive integer of not less than 2) times the driving power by use of a switching device which is switched in response to the first switching control signal and outputs the converted DC power to a first output line; and a charge pump part that converts 1/N times the DC power from the first output line to a level of the driving power by use of the square wave signal supplied from the square wave signal supplier in response to the second switching control signal and supplies the converted DC power to the driving apparatus through the second output line.

In the power supply, the booster includes an inductor and a first diode connected between the power source and the first output line; a first capacitor connected between a ground voltage source and a node that is between the power source and the inductor; a second capacitor connected between the first output line and the square wave signal supplier; and a switching device connected between the ground voltage source and a node that is between the first diode and the inductor to switch an energy stored at the inductor to the first output line as well as switching an energy from the power source to the inductor in response to the first switching control signal from the DC-DC controller.

In the power supply, the square wave signal supplier includes a high voltage source to supply high voltage; and a switching device that converts the high voltage from the high voltage source into the square wave in accordance with the second switching control signal from the DC-DC controller and supplies the converted square wave to the second capacitor.

In the power supply, the charge pump part includes the second capacitor; a second diode connected between the first output line and the second output line; and a third capacitor connected between the ground voltage source and a node that is between the second diode and the second output line.

In the power supply, the DC-DC converter includes a charge pump part that converts the DC power to a level of 1/N (provided that N is a positive integer of not less than 2) times the driving power by use of a square wave signal supplied from the square wave signal supplier in response to the second switching control signal and outputs the converted DC power to a first output line; and a booster that converts 1/N times the DC power supplied from the first output line to a level of the driving power by use of a switching device that is switched in response to the first switching control signal and supplies the converted DC power to the driving apparatus through the second output line.

In the power supply, the charge pump part includes a first diode and a second diode connected between the power source and the first output line; a first capacitor connected between a ground voltage source and a node that is between the power source and the first diode; and a second capacitor connected between the square wave signal supplier and a node that is between the first and second diodes.

In the power supply, the square wave signal supplier includes a low voltage source to supply low voltage; and a switching device that converts the low voltage from the low voltage source into the square wave in accordance with the second switching control signal from the DC-DC controller and supplies the converted square wave to the second capacitor.

In the power supply, the booster includes an inductor and a third diode connected between the first output line and the second output line; a third capacitor connected between a ground voltage source and a node that is between the first output line and the inductor; a fourth capacitor connected between the ground voltage source and a node that is between the third diode and the second output line; and a switching device connected between the ground voltage source and a node that is between the inductor and the third diode to switch an energy stored at the inductor to the second output line as well as switching an energy from the input line to the inductor in response to the first switching control signal from the DC-DC controller.

A driving apparatus of an electroluminescence display device according to another aspect of the present invention includes an electroluminescence display device to display a picture; a power source to supply DC power; and a DC-DC converter to convert the DC power from the power source to a level of 1/N (provided that N is a positive integer of not less than 2) times the driving power for driving the electroluminescence display device, and then to convert the converted DC power of 1/N times to a level of the driving power.

The driving apparatus further includes a square wave signal supplier to supply a square wave signal to the DC-DC converter; and a DC-DC controller that generates a second switching control signal for controlling the square wave signal supplier and in addition generates a first switching control signal synchronized with the second-switching control signal.

In the driving apparatus, the DC-DC converter includes a booster that converts the DC power to a level of 1/N (provided that N is a positive integer of not less than 2) times the driving power by use of a switching device which is switched in response to the first switching control signal and outputs the converted DC power to a first output line; and a charge pump part that converts 1/N times the DC power from the first output line to a level of the driving power by use of the square wave signal supplied from the square wave signal supplier in response to the second switching control signal and supplies the converted DC power to the driving apparatus through the second output line.

In the driving apparatus, the booster includes an inductor and a first diode connected between the power source and the first output line; a first capacitor connected between a ground voltage source and a node that is between the power source and the inductor; a second capacitor connected between the first output line and the square wave signal supplier; and a switching device connected between the ground voltage source and a node that is between the first diode and the inductor to switch an energy stored at the inductor to the first output line as well as switching an energy from the power source to the inductor in response to the first switching control signal from the DC-DC controller.

In the driving apparatus, the square wave signal supplier includes a high voltage source to supply high voltage; and a switching device that converts the high voltage from the high voltage source into the square wave in accordance with the second switching control signal from the DC-DC controller and supplies the converted square wave to the second capacitor.

In the driving apparatus, the charge pump part includes the second capacitor; a second diode connected between the first output line and the second output line; and a third capacitor connected between the ground voltage source and a node that is between the second diode and the second output line.

In the driving apparatus, the DC-DC converter includes a charge pump part that converts the DC power to a level of 1/N (provided that N is a positive integer of not less than 2) times the driving power by use of a square wave signal supplied from the square wave signal supplier in response to the second switching control signal and outputs the converted DC power to a first output line; and a booster that converts 1/N times the DC power supplied from the first output line to a level of the driving power by use of a switching device that is switched in response to the first switching control signal and supplies the converted DC power to the driving apparatus through the second output line.

In the driving apparatus, the charge pump part includes a first diode and a second diode connected between the power source and the first output line; a first capacitor connected between a ground voltage source and a node that is between the power source and the first diode; and a second capacitor connected between the square wave signal supplier and a node that is between the first and second diodes.

In the driving apparatus, the square wave signal supplier includes a low voltage source to supply low voltage; and a switching device that converts the low voltage from the low voltage source into the square wave in accordance with the second switching control signal from the DC-DC controller and supplies the converted square wave to the second capacitor.

In the driving apparatus, the booster includes an inductor and a third diode connected between the first output line and the second output line; a third capacitor connected between a ground voltage source and a node that is between the first output line and the inductor; a fourth capacitor connected between the ground voltage source and a node that is between the third diode and the second output line; and a switching device connected between the ground voltage source and a node that is between the inductor and the third diode to switch an energy stored at the inductor to the second output line as well as switching an energy from the input line to the inductor in response to the first switching control signal from the DC-DC controller.

A driving method of a power supply that supplies a driving power to drive a driving apparatus according to still another aspect of the present invention includes a first step of generating a DC power; a second step of converting the DC power into a voltage of 1/N (provided that N is a positive integer of not less than 2) times the driving power and outputting the converted driving power to a first output line; and a third step of converting the converted voltage of 1/N times the driving power to a level of the driving power and supplying the converted voltage to the driving apparatus through a second output line.

The driving method further includes a fourth step of generating a first switching control signal to switch a switching device; a fifth step of generating a second switching control signal synchronized with the first switching control signal; and a sixth step of converting a voltage from a voltage source into a square wave signal in accordance with the second switching control signal.

In the driving method, the second step includes the steps of: storing the DC power at an inductor and supplying the stored energy to the first output line through a first diode connected between the inductor and the first output line by switching the switching device in accordance with the first switching control signal; supplying the square wave signal generated in accordance with the second switching control signal to a first capacitor connected to the first output line, and supplying the voltage stored at the first capacitor to the first output line; and generating a voltage of 1/N times the driving power by use of an energy from the inductor and a voltage from the first capacitor supplied to the first output line.

In the driving method, the third step includes the steps of: storing the voltage on the first output line to a second capacitor connected between the second output line and a ground voltage source through a second diode connected between the first and second output lines; and generating the driving power by use of the voltage on the first output line supplied through the second diode and the voltage stored at the second capacitor and supplying the generated driving power to the driving apparatus through the second output line.

In the driving method, the second step includes the steps of: storing the square wave signal generated in accordance with the second switching control signal to a first capacitor connected to the first output line; supplying the DC power to the first output line through a first diode connected between an input line of the DC power and the first output line; and generating a voltage of 1/N times the driving power by use of a voltage stored at the first capacitor and the DC power supplied through the first diode, and supplying the generated voltage of 1/N times the driving power to the first output line through a second diode connected between the first output line and the first capacitor.

In the driving method, the third step includes the steps of: storing the voltage of 1/N times supplied from the first output line and storing the stored energy at a second capacitor connected between the second output line and a ground voltage source; and generating the driving power by use of the voltage stored at the second capacitor and the voltage from the first output line by switching the switching device in accordance with the first switching control signal and supplying the generated driving power to the driving apparatus.

A method for driving an electroluminescence display device to display a picture by use of a driving power from a power supply according to still another aspect of the present invention includes a first step of generating a DC power; a second step of converting the DC power into a voltage of 1/N (provided that N is a positive integer of not less than 2) times the driving power and outputting the converted driving power to a first output line; and a third step of converting the converted voltage of 1/N times the driving power to a level of the driving power and supplying the converted voltage to the electroluminescence display device through a second output line.

The method further includes a fourth step of generating a first switching control signal to switch a switching device; a fifth step of generating a second switching control signal synchronized with the first switching control signal; and a sixth step of converting a voltage from a voltage source into a square wave signal in accordance with the second switching control signal.

In the method, the second step includes the steps of: storing the DC power at an inductor and supplying the stored energy to the first output line through a first diode connected between the inductor and the first output line by switching the switching device in accordance with the first switching control signal; supplying the square wave signal generated in accordance with the second switching control signal to a first capacitor connected to the first output line, and supplying the voltage stored at the first capacitor to the first output line; and generating a voltage of 1/N times the driving power by use of an energy from the inductor and a voltage from the first capacitor supplied to the first output line.

In the method, the third step includes the steps of: storing the voltage on the first output line to a second capacitor connected between the second output line and a ground voltage source through a second diode connected between the first and second output lines; and generating the driving power by use of the voltage on the first output line supplied through the second diode and the voltage stored at the second capacitor and supplying the generated driving power to the electroluminescence display device through the second output line.

In the method, the second step includes the steps of: storing the square wave signal generated in accordance with the second switching control signal to a first capacitor connected to the first output line; supplying the DC power to the first output line through a first diode connected between an input line of the DC power and the first output line; and generating a voltage of 1/N times the driving power by use of a voltage stored at the first capacitor and the DC power supplied through the first diode, and supplying the generated voltage of 1/N times the driving power to the first output line through a second diode connected between the first output line and the first capacitor.

In the method, the third step includes the steps of storing the voltage of 1/N times supplied from the first output line and storing the stored energy at a second capacitor connected between the second output line and a ground voltage source; and generating the driving power by use of the voltage stored at the second capacitor and the voltage from the first output line by switching the switching device in accordance with the first switching control signal and supplying the generated driving power to the electroluminescence display device.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

With reference to FIGS. 2 to 8, embodiments of the present invention will be explained as follows.

Figure 1:
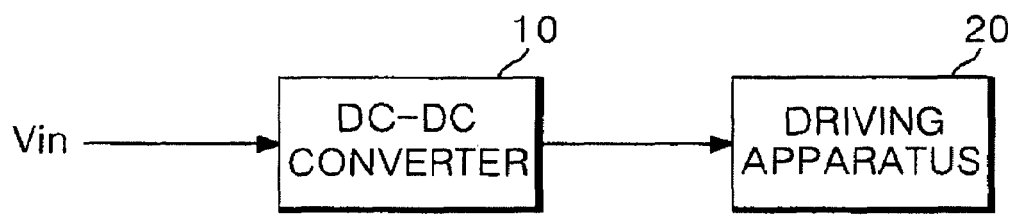
FIG. 1 is a block diagram representing a prior art power supply.
Figure 2:
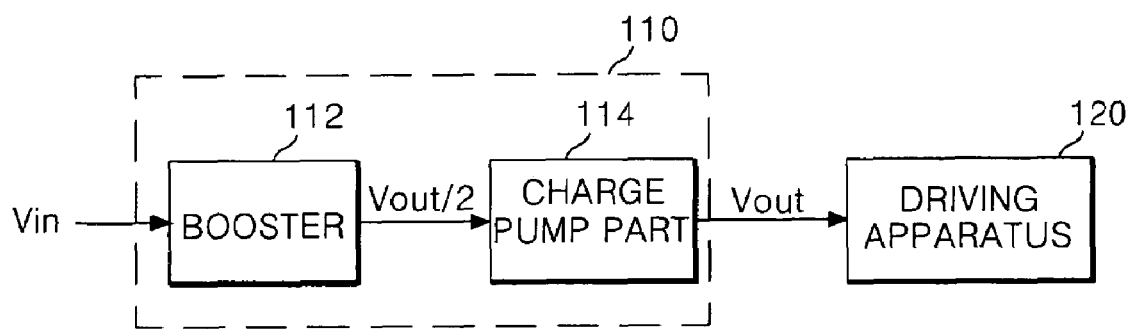
FIG. 2 is a block diagram representing a power supply in accordance with a first embodiment of the present invention.

Referring to FIG. 2, a power supply according to the present invention includes a DC-DC converter 110 to boost a DC voltage Vin inputted through an input line for supplying the boosted DC voltage to a driving apparatus 120.

The driving apparatus 120 includes a flat panel display device driven by the DC voltage supplied from the DC-DC converter 110. Herein, the flat panel display device includes a liquid crystal display, a field emission display, a plasma display panel and an electroluminescence display device.

The plasma display panel is most advantageous in make large-sized screen because its structure and fabricating process is relatively simple, but has a disadvantage that its light emission efficiency and brightness is low and its power consumption is high. The liquid crystal display has difficulty in make large-sized screen because a semiconductor fabricating process is used, but its demand is increasing because it is mainly used as the display device of notebook computers. However it has a big disadvantage that it is difficult in being made large-sized and its power consumption is high. Also, the liquid crystal display has a disadvantage that light loss is high and its viewing angle is narrow due to optical devices such as a polarizing filter, a prism sheet, a diffusion sheet and etc. In comparison to this, the electroluminescence display device has fast response speed and its light emission efficiency, brightness and viewing angle are high. The electroluminescence display device among them is a self-luminous device, which makes a fluorescent material emit light by re-combining electrons with electronic holes, and it is generally classified into an inorganic electroluminescence display device and an organic electroluminescence in accordance with its material and structure. Such an electroluminescence display device has an advantage that its response speed is as fast as a cathode ray tube in comparison with a passive light emitting device, which requires a separate light source like the liquid crystal display. Also, the electroluminescence display has low DC driving voltage and is possible to be made ultra-thin, thus it is applicable to a wall type or mobile type of display device.

Figure 3:
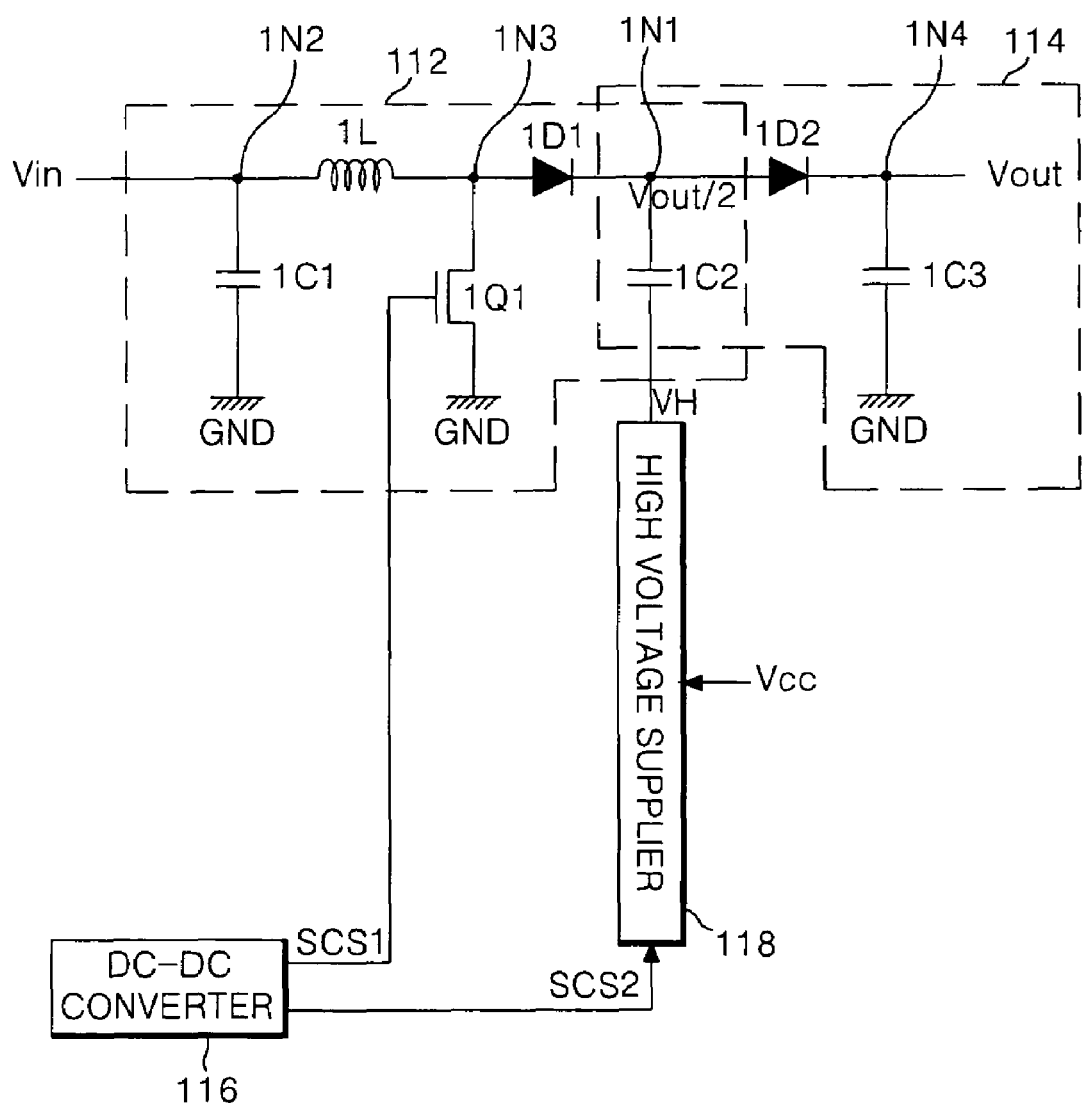
FIG. 3 is a circuit diagram representing a power supply shown in FIG. 2.
Figure 4:
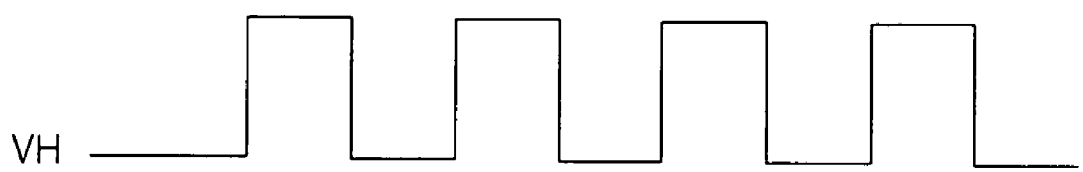
FIG. 4 is a waveform diagram representing a square wave signal outputted from a high voltage supplier shown in FIG. 3.

A DC-DC converter 110 according to a first embodiment of the present invention, as shown in FIG. 3, includes a booster 112 to boost a DC voltage Vin supplied from an input line to half Vout/2 of an output voltage Vout by use of a switching device 1Q1, a charge pump part 114 to convert the half Vout/2 of the output voltage from the booster 112 into the output voltage Vout by a charge pumping method and supplied the converted output voltage Vout to a driving apparatus 120, a high voltage supplier 118 to supply high voltage VH to the charge pump part 114, and a DC-DC controller 116 to control the high voltage supplier 118 as well as controlling the switching action of the switching device 1Q1.

The DC-DC controller 116 generates a first switching control signal SCS1 to switch the switching device 1Q1, and in addition, generates a second switching control signal SCS2 to switch the high voltage supplier 118, which is synchronized with the first switching control signal SCS1.

The booster 112 includes an inductor 1L and a first diode 1D1 connected in serial between the input line and a first node 1N1 the output line; a first capacitor 1C1 connected between aground voltage source GND and a second node 1N2 that is between the input line and the inductor 1L; a switching device 1Q1 connected between the ground voltage source GND and a third node 1N3 that is between the inductor 1L and the first diode 1D1; and a second capacitor 1C2 connected between the first node 1N1 and the high voltage supplier 118.

The first capacitor 1C1 plays the role of stabilizing the DC voltage Vin supplied to the inductor 1L from the input line.

The switching device 1Q1 responds to the first switching control signal SCS1 supplied from the DC-DC controller 116 to cause the energy stored at the inductor 1L to be supplied to the first node 1N1 through the first diode 1D1 as well as causing the voltage stored at the first capacitor 1C1 to be supplied to the inductor 1L. That is, the switching device 1Q1 forms a path so that the energy from the first capacitor 1C1 is supplied to the inductor 1L while it is switched on and forms a path so that the energy from the inductor 1L is supplied to the first node 1N1 through the firs diode 1D1 while it is switched off.

The inductor 1L receives and stores the energy stored at the first capacitor 1C1 and supplies the stored energy to the first node 1N1 through the first diode 1D1 in accordance with the switching state of the switching device 1Q1.

The first diode 1D1 plays the role of intercepting the reverse voltage flowing toward the inductor 1L from the second capacitor 1C2.

The second capacitor 1C2 has its second terminal connected to the output terminal of the high voltage supplier 118 as well as its first terminal connected to the first node 1N1. Accordingly, the second capacitor 1C2 stores the energy supplied from the high voltage supplier 118 and supplies the stored energy to the first node 1N1.

In this way, the booster 112 boosts the DC voltage Vin supplied from the input line to a voltage Vout/2 corresponding to half of the output voltage Vout of the DC-DC converter 110.

The charge pump part 114 includes a second capacitor 1C2 of the booster part 112, a second diode 1D2 connected between the first node 1N1 and the output line Vout, and a third capacitor 1C3 connected between the ground voltage source GND and a fourth node 1N4 that is between the second diode 1D2 and the output line Vout.

The second capacitor 1C2 is commonly used in the booster 112 and the charge pump part 114.

The second diode 1D2 intercepts the voltage flowing toward the booster 112 from the third capacitor 1C3. The third capacitor 1C3 receives and stores the voltage Vout/2 corresponding to the half of the output voltage Vout of the DC-DC converter 110 from the booster 112, and supplies the stored voltage to the fourth node 1N4.

The charge pump part 114 supplies the votage Vout/2 corresponding to the half of the output voltage Vout of the DC-DC converter 110 supplied from the booster 112 and the output voltage Vout of the desired DC-DC converter 110 by the voltage stored at the third capacitor 1C3, to the driving apparatus 120.

In this way, the DC-DC converter 110 according to the first embodiment of the present invention boosts the input voltage Vin to the voltage Vout/2 corresponding to the half of the output voltage Vout of the DC-DC converter 110 by use of the booster 112, and boosts the voltage Vout/2 corresponding to the half of the output voltage of the DC-DC converter boosted at the booster 112 again to twice the voltage by use of the charge pump 114, thereby generating the output voltage Vout of the desired DC-DC converter 110 to supply it to the driving apparatus 120.

More specifically, the booster 112 of the DC-DC converter 110 switches the switching device 1Q1 in accordance with a first switching control signal SCS1 from a DC-DC controller 116 to store the DC voltage Vin from the input line at the inductor 1L, and it supplies the energy stored at the inductor 1L to the first node 1N1. At the same time, it stores a high voltage VH of square wave from the high voltage supplier 118 at the second capacitor 1C2, and supplies the voltage stored at the second capacitor 1C2 to the first node 1N1, thereby supplying the voltage Vout/2 corresponding to the half of the output voltage Vout of the DC-DC converter 110 to the charge pump part 114.

And then, the charge pump part 114 stores the voltage Vout/2 corresponding to the half of the output voltage Vout of the DC-DC converter 110 inputted from the booster 112 at the third capacitor 1C3 and supplies the stored voltage to the fourth node 1N4. At the same time, it supplies the output voltage Vout of the desired DC-DC converter 110 to the driving apparatus 120 by the output voltage of the booster 112.

For example, in case that a DC-DC converter 110 has the input voltage Vin of 3V and the output voltage Vout of 20V, i.e., the difference between the input voltage Vin and the output voltage Vout is more than four times the input voltage, it is described as follows. First of all, assumed that the output voltage Vout of the DC-DC converter 110 is 20V and the threshold voltage of the first diode 1D1 is 0.5V, 20=2×V−0.5. Accordingly, 'V' is 10.25V. It is the input voltage of the charge pump part 114 and, at the same time, the output voltage of the booster 112.

Thus, the DC-DC converter 110 according to the first embodiment of the present invention can have maximum efficiency of more than 95% because the difference between the input voltage Vin and the output voltage Vout/2 is not more than four times of the input voltage if the switching state of the switching device and the high voltage supplier 118 in order to have the output voltage Vout/2 of 10.25V with the input voltage Vin of 3V. Also, the DC-DC converter 110 according to the first embodiment of the present invention uses only the charge pump part 114 of one tier, so it can have maximum efficiency to enable to increase energy conversion efficiency in general.

Figure 5:
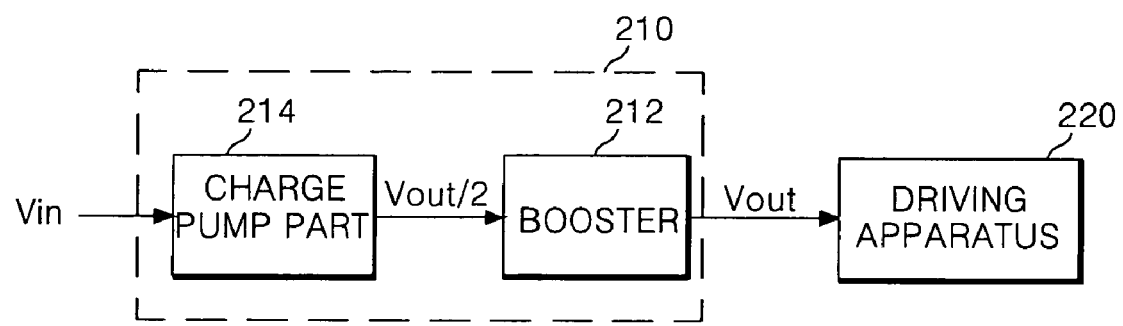
FIG. 5 is a block diagram representing a power supply according to a second embodiment of the present invention.
Figure 6:
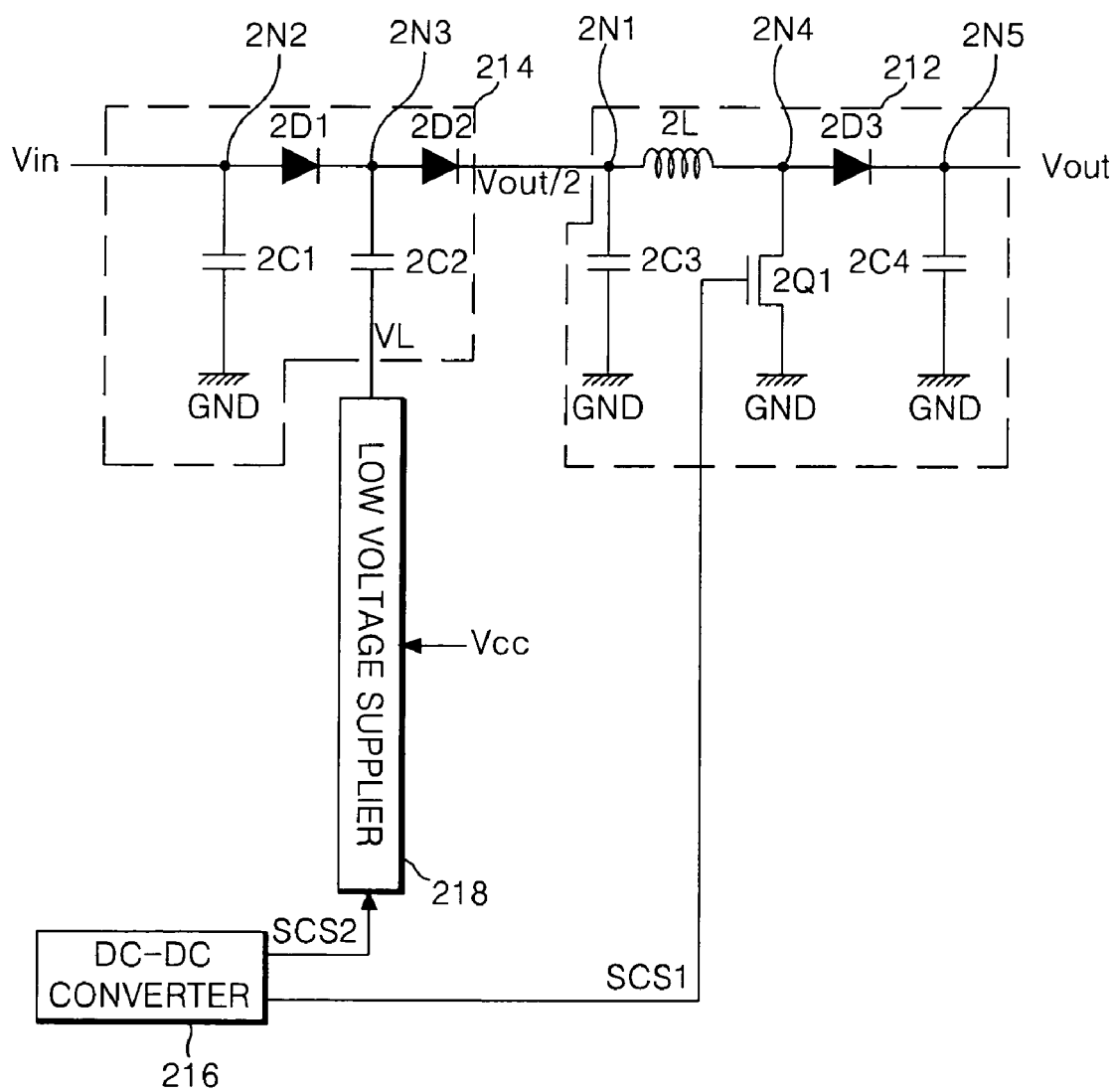
FIG. 6 is a circuit diagram representing a power supply shown in FIG. 5.

Referring to FIGS. 5 and 6, a DC-DC converter 210 according to a second embodiment of the present invention includes a charge pump part 214 to boost a DC voltage Vin supplied from an input line to half Vout/2 of the output voltage Vout by use of a charge pumping method, a booster 212 to convert half Vout/2 of an output voltage Vout from the charge pump part 214 by use of a switching device 2Q1, a low voltage supplier 218 to supply low voltage to the charge pump part 214, and a DC-DC controller 216 to control the low voltage supplier 218 as well as controlling the switching action of the switching device 2Q1.

The DC-DC controller 216 generates a first switching control signal SCS1 to switch the switching device 2Q1, and in addition, generates a second switching control signal SCS2 to switch the low voltage supplier 218, which is synchronized with the first switching control signal SCS2.

Figure 7:
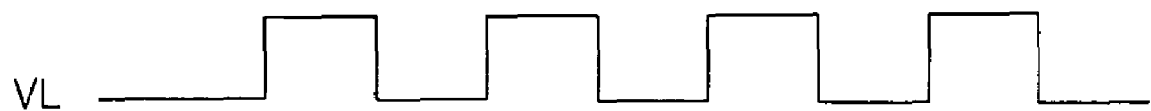
FIG. 7 is a waveform diagram representing a square wave signal outputted from a low voltage supplier shown in FIG. 6.

The low voltage supplier 218 supplies the low voltage VL inputted from a voltage source Vcc to a second capacitor 2C2 by switching a switching device (not shown) in response to the second switching control signal SCS2 supplied from the DC-DC controller 216. At this moment, the low voltage VL supplied to the second capacity from the low voltage supplier 218 in accordance with the second switching control signal SCS2 supplied from the DC-DC controller 216 has a shape of square wave as shown in FIG. 7.

The charge pump part 214 includes a first diode 2D1 and a second diode 2D2 connected between the input line and the output line Vout/2, a first capacitor 2C1 connected between a ground voltage source GND and a second node 2N2 that is between the first diode 2D1 and the input line, and a second capacitor connected between the low voltage supplier 218 and a third node 2N3 that is between the first and second diodes 2D1, 2D2.

The first capacitor 2C1 plays the role of stabilizing the DC voltage Vin supplied to the third node 2N3 from the input line through the first diode 2D1.

The first diode 2D1 plays the role of intercepting the voltage flowing toward the second node 2N2 from the second capacitor 2C2.

The second capacitor 2C2 receives the low voltage VL of square wave, as shown in FIG. 7, from the low voltage supplier 218 and stores it, and then it supplies the stored low voltage VL to the third node 2N3. Accordingly, the voltage on the third node 2N3 is outputted to the output line through the second diode 2D2. At this moment, the voltage on the third node 2N3 is the voltage Vout/2 corresponding to half of the output voltage Vout from the DC-DC converter 210.

Such a charge pump part 214 generates the voltage Vout/2 corresponding to the half of the output voltage Vout from the DC-DC converter 210 by use of the low voltage VL from the low voltage supplier 218 stored at the second capacitor 2C2 and the DC voltage Vin supplied from the input line to supply the generated voltage to the booster 212.

The booster 212 includes an inductor 2L and a third diode 2D3 connected in serial between the output line Vout and a first node 2N1 that is connected to the output of the charge pump part 214; a third capacitor 2C3 connected between a ground voltage source GND and a first node 2N1; a switching device 2Q1 connected between the ground voltage source GND and a fourth node 2N4 that is between the inductor 2L and the third diode 2D3; and a fourth capacitor 2C4 connected between the ground voltage source GND and a fifth node 2N5 that is between the third diode 2D3 and the output line Vout.

The third capacitor 2C3 plays the role of stabilizing the voltage Vout/2 corresponding to the half of the output voltage of the DC-DC converter 210 supplied to the inductor 2L from the charge pump part 214.

The switching device 2Q1 responds to the first switching control signal SCS1 supplied from the DC-DC controller 216 to cause the energy stored at the inductor 2L to be supplied to the fifth node 2N5 through the third diode 2D3 as well as causing the voltage on the first node 2N1 to be supplied to the inductor 2L.

The inductor 2L receives and stores the energy on the first node 2N1 and supplies the stored energy to the fifth node 2N5 through the third diode 2D3, in accordance with the switching state of the switching device 2Q1.

The third diode 2D3 plays the role of intercepting the reverse voltage flowing toward the inductor 2L from the fourth capacitor 2C4.

The fourth capacitor 2C4 plays the role of stabilizing that the energy from the inductor 2L via the third diode 2D3 in accordance with the switching state of the switching device 2Q1 is supplied to the driving apparatus 220 through the output line Vout.

In this way, the booster 212 boosts the voltage Vout/2 corresponding to the half of the output voltage Vout of the DC-DC converter 210 supplied from the charge pump part 214 to twice the voltage by use of the booster method, thereby generating the output voltage Vout of the DC-DC converter 210.

In this way, the DC-DC converter 210 according to the second embodiment of the present invention boosts the input voltage Vin to the voltage Vout/2 corresponding to the half of the output voltage Vout of the DC-DC converter 210 by use of the charge pump part 214, and boosts the voltage Vout/2 corresponding to the half of the output voltage of the DC-DC converter boosted at the charge pump part 214 again to twice the voltage by use of the booster 212, thereby generating the output voltage Vout of the desired DC-DC converter 210 to supply it to the driving apparatus 220.

More specifically, the charge pump 214 of the DC-DC converter 210 generates the voltage Vout/2 corresponding to the half of the output voltage Vout of the DC-DC converter 210 to supply it to the booster 212 by use of the low voltage VL from the low voltage supplier 218 stored at the second capacitor 2C2 by the second switching control signal SCS2 from the DC-DC controller 216 and the input voltage Vin supplied from the input line through the first diode 2D1.

And then, the booster 212 switches the switching device 2Q1 in accordance with the first switching control signal SCS1 of the DC-DC controller 216 to store the voltage Vout/2 corresponding to the half of the output voltage Vout of the DC-DC converter 210 supplied from the charge pump part 214 at the inductor 2L. At the same time, it supplies the energy stored at the inductor 2L to the driving apparatus 220 through the third diode 2D3.

At this moment, the energy stored at the inductor 2L corresponds to the output voltage Vout of the DC-DC converter 110 in accordance with the switching status of the switching device 2Q1 by the first switching control signal SCS1 from the DC-DC controller 216 and the energy of the inductor 2L is supplied to the driving apparatus 220 through the third diode 2D3 in accordance with the switching state of the switching device 2Q1. As a result, the booster 212 boosts the voltage Vout/2 corresponding to the half of the output voltage Vout of the DC-DC converter 210 inputted from the charge pump part 214 to twice the voltage and supplies it to the driving apparatus 220.

For example, in case that a DC-DC converter 110 has the input voltage Vin of 3V and the output voltage Vout of 20V, i.e., the difference between the input voltage Vin and the output voltage Vout is more than four times the input voltage, it is described as follows. First of all, the output voltage Vout/2 of the charge pump part 214 is 2×input voltage Vin−the threshold voltage Vth of the first diode 2D1. Accordingly, assumed that the threshold voltage of the first diode 2D1 is 0.5V, the output voltage Vout/2 of the charge pump 214 is 5.5V. The output voltage Vout/2 of the charge pump part 214 becomes the input voltage of the booster 212. On the other hand, the booster 212 the switching state of the switching device 2Q1 is controlled for the input voltage of 5.5V from the charge pump part 212 to have the output voltage Vout of 20V, it can get the maximum efficiency because the difference between the input voltage Vin and the output voltage Vout/2 is not more than four times the input voltage. Further, the DC-DC converter 210 according to the second embodiment of the present invention might have the maximum efficiency because it only uses the charge pump part 214 of one tier, thus energy conversion efficiency can be increased in general.

Figure 8:
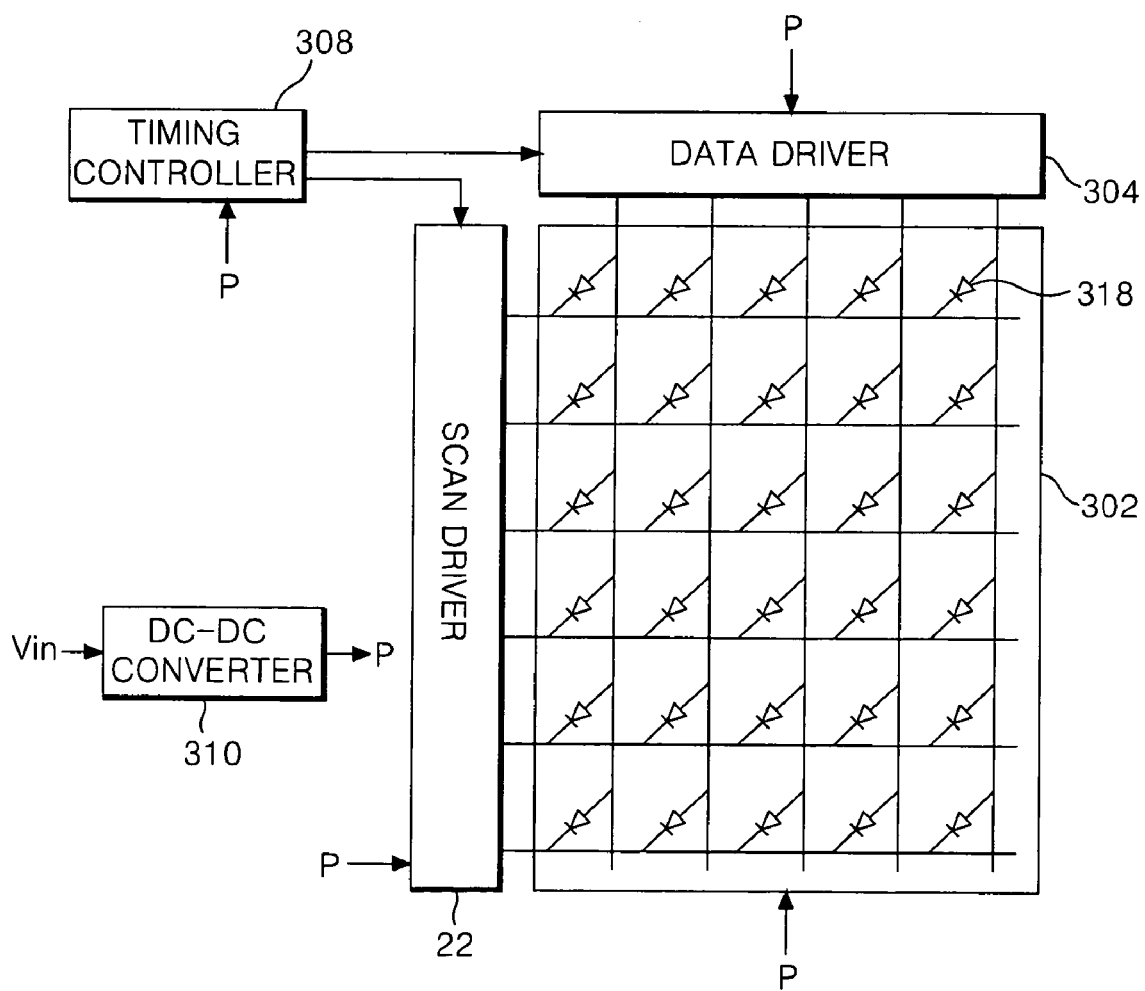
FIG. 8 is a driving apparatus of an electroluminescence display device according to another embodiment of the present invention.

Referring to FIG. 8, a driving apparatus of an electroluminescence display device using a power supply according to another embodiment of the present invention includes a display panel 302 having EL cells 318 at intersections of scan electrode lines SEL and data electrode lines DEL; a scan driver 306 to drive the scan electrode lines SEL of the display panel 302; a data driver 304 to drive the data electrode lines DEL of the display panel 302; a timing controller 308 to control each of the scan driver 306 and the data driver 304; and a DC-DC converter 310 to generate the voltage and current required for driving the EL display device.

Each of the EL cells 318 is selected to generate light corresponding to a pixel signal, i.e., current signal, supplied to the data electrode line DEL of positive pole when a scan pulse is applied to the scan electrode line SEL. The EL cells 318 are each formed at every intersection of the data electrode line DEL and the scan electrode line SEL and might be expressed equivalent to a diode. The EL cells 318 each have a negative scan pulse supplied to an arbitrary scan electrode line SEL and at the same time a positive current applied to the data electrode line DEL in accordance with the data signal, so the EL cells 318 of the scan line, where a forward voltage is applied, are made to emit light.

The scan driver 306 sequentially supplies a negative scan pulse to a plurality of scan electrode lines SEL to select the scan line where the data is displayed. For this, the scan driver 306 includes shift registers that sequentially shift an input shift start pulse and output the shifted pulse; and level shifters that level-shift the shift signal from the shift register to the scan pulse suitable for driving the scan electrode line SEL and output the level-shifted pulse.

The data driver 304 supplies the constant current synchronized with the scan pulse to each of the data electrode lines DEL by use of a constant current source (not shown).

The timing controller 308 supplies control signals together with data to the data driver 304 as well as supplying gate control signals GCS to the scan driver 306.

The DC-DC converter 310 has the same components as the DC-DC converters 110, 210 according to the first and second embodiments of the present invention shown in FIGS. 3 and 6. Accordingly, the description about the DC-DC converter 310 according to another embodiment of the present invention is to be replaced with the description of the DC-DC converters 110, 210 according to the first and secnd embodiments of the foregoing present invention.

Therefore, an apparatus and method for driving an electroluminescence display device using a power supply according to another embodiment of the present invention generates the voltage Vout/2 which is half the output voltage Vout from the booster and boosts the half Vout/2 of the generated output voltage Vout to twice the voltage by the charge pumping method to generate a desired output voltage Vout in case that the difference between the input voltage Vin and the output voltage Vout of the DC-DC converter 310 is not less than four times the input voltage. Accordingly, maximum efficiency can be obtained because the difference between the input voltage and the output voltage is not more than four times the input voltage in the booster, and the energy conversion efficiency might be increased in general because the maximum efficiency is obtained due to the use of the charge pump part of one tier. Accordingly, an apparatus and method for driving an electroluminescence display device using a power supply according to another embodiment of the present invention can improve the energy conversion efficiency of the DC-DC converter 310 which generates the voltage and current required for driving the EL display device.

As described above, a power supply and a driving method thereof and an apparatus and method for driving an electroluminescence display device using the same generates an input voltage that is half of the output voltage by the booster method and controls the output voltage by using the generated voltage in the charge pump method. Accordingly, the present invention might improve the energy conversion efficiency in case that the difference between the input voltage and the output voltage of the DC-DC converter is not less than four times the input voltage.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A driving apparatus of an electroluminescence display device, comprising:
   an electroluminescence display device to display a picture;
   a power source to supply DC power; and
   a DC-DC converter to convert the DC power from the power source to a level of 1/N (provided that N is a positive integer of not less than 2) times the driving power for driving the electroluminescence display device, and then to convert the converted DC power of 1/N times to a level of the driving power,
   wherein the DC-DC converter comprises a booster and a charge pump part.

2. The driving apparatus according to claim 1, further comprising:
   a square wave signal supplier to supply a square wave signal to the DC-DC converter; and
   a DC-DC controller that generates a second switching control signal for controlling the square wave signal supplier and in addition generates a first switching control signal synchronized with the second switching control signal.

3. The driving apparatus according to claim 2, wherein the DC-DC converter includes:
   the booster that converts the DC power to a level of 1/N (provided that N is a positive integer of not less than 2) times the driving power by use of a switching device which is switched in response to the first switching control signal and outputs the converted DC power to a first output line; and
   the charge pump part that converts 1/N times the DC power from the first output line to a level of the driving power by use of the square wave signal supplied from the square wave signal supplier in response to the second switching control signal and supplies the converted DC power to the driving apparatus through the second output line.

4. The driving apparatus according to claim 3, wherein the booster includes:
   an inductor and a first diode connected between the power source and the first output line;
   a first capacitor connected between a ground voltage source and a node that is between the power source and the inductor;
   a second capacitor connected between the first output line and the square wave signal supplier; and
   a switching device connected between the ground voltage source and a node that is between the first diode and the inductor to switch an energy stored at the inductor to the first output line as well as switching an energy from the power source to the inductor in response to the first switching control signal from the DC-DC controller.

5. The driving apparatus according to claim 4, wherein the square wave signal supplier includes:
   a high voltage source to supply high voltage; and
   a switching device that converts the high voltage from the high voltage source into the square wave in accordance with the second switching control signal from the DC-DC controller and supplies the converted square wave to the second capacitor.

6. The driving apparatus according to claim 4, wherein the charge pump part includes:
   the second capacitor;
   a second diode connected between the first output line and the second output line; and
   a third capacitor connected between the ground voltage source and a node that is between the second diode and the second output line.

7. The driving apparatus according to claim 2, wherein the DC-DC converter includes:
   the charge pump part that converts the DC power to a level of 1/N (provided that N is a positive integer of not less than 2) times the driving power by use of a square wave signal supplied from the square wave signal supplier in response to the second switching control signal and outputs the converted DC power to a first output line; and
   the booster that converts 1/N times the DC power supplied from the first output line to a level of the driving power by use of a switching device that is switched in response to the first switching control signal and supplies the converted DC power to the driving apparatus through the second output line.

8. The driving apparatus according to claim 7, wherein the charge pump part includes:
   a first diode and a second diode connected between the power source and the first output line;
   a first capacitor connected between a ground voltage source and a node that is between the power source and the first diode; and
   a second capacitor connected between the square wave signal supplier and a node that is between the first and second diodes.

9. The driving apparatus according to claim 8, wherein the square wave signal supplier includes:
   a low voltage source to supply low voltage; and
   a switching device that converts the low voltage from the low voltage source into the square wave in accordance with the second switching control signal from the DC-DC controller and supplies the converted square wave to the second capacitor.

10. The driving apparatus according to claim 7, wherein the booster includes:
    an inductor and a third diode connected between the first output line and the second output line;
    a third capacitor connected between a ground voltage source and a node that is between the first output line and the inductor;
    a fourth capacitor connected between the ground voltage source and a node that is between the third diode and the second output line; and
    a switching device connected between the ground voltage source and a node that is between the inductor and the third diode to switch an energy stored at the inductor to the second output line as well as switching an energy from the input line to the inductor in response to the first switching control signal from the DC-DC controller.

11. A driving method of a power supply that supplies a driving power to drive a driving apparatus, comprising:
    a first step of generating a DC power;
    a second step of converting the DC power into a voltage of 1/N (provided that N is a positive integer of not less than 2) times the driving power and outputting the converted driving power to a first output line; and a third step of converting the converted voltage of 1/N times the driving power to a level of the driving power and supplying the converted voltage to the driving apparatus through a second output line;

a fourth step of generating a first switching control signal to switch a switching device;

a fifth step of generating a second switching control signal synchronized with the first switching control signal; and a sixth step of converting a voltage from a voltage source into a square wave signal in accordance with the second switching control signal, wherein the second step includes the steps of:

storing the DC power at an inductor and supplying the stored energy to the first output line through a first diode connected between the inductor and the first output line by switching the switching device in accordance with the first switching control signal;

supplying the square wave signal generated in accordance with the second switching control signal to a first capacitor connected to the first output line, and supplying the voltage stored at the first capacitor to the first output line; and generating a voltage of 1/N times the driving power by use of an energy from the inductor and a voltage from the first capacitor supplied to the first output line.

12. The driving method according to claim 11, wherein the third step includes the steps of:

storing the voltage on the first output line to a second capacitor connected between the second output line and a ground voltage source through a second diode connected between the first and second output lines; and generating the driving power by use of the voltage on the first output line supplied through the second diode and the voltage stored at the second capacitor and supplying the generated driving power to the driving apparatus through the second output line.

13. The driving method of a power supply that supplies a driving power to drive a driving apparatus, comprising:

a first step of generating a DC power;

a second step of converting the DC power into a voltage of 1/N (provided that N is a positive integer of not less than 2) times the driving power and outputting the converted driving power to a first output line;

a third step of converting the converted voltage of 1/N times the driving power to a level of the driving power and supplying the converted voltage to the driving apparatus through a second output line;

a fourth step of generating a first switching control signal to switch a switching device;

a fifth step of generating a second switching control signal synchronized with the first switching control signal; and a sixth step of converting a voltage from a voltage source into a square wave signal in accordance with the second switching control signal, wherein the second step includes the steps of:

storing the square wave signal generated in accordance with the second switching control signal to a first capacitor connected to the first output line;

supplying the DC power to the first output line through a first diode connected between an input line of the DC power and the first output line; and generating a voltage of 1/N times the driving power by use of a voltage stored at the first capacitor and the DC power supplied through the first diode, and supplying the generated voltage of 1/N times the driving power to the first output line through a second diode connected between the first output line and the first capacitor.

14. The driving method according to claim 13, wherein the third step includes the steps of:

storing the voltage of 1/N times supplied from the first output line and storing the stored energy at a second capacitor connected between the second output line and a ground voltage source; and generating the driving power by use of the voltage stored at the second capacitor and the voltage from the first output line by switching the switching device in accordance with the first switching control signal and supplying the generated driving power to the driving apparatus.

15. A method for driving an electroluminescence display device to display a picture by use of a driving power from a power supply, comprising:

a first step of generating a DC power;

a second step of converting the DC power into a voltage of 1/N (provided that N is a positive integer of not less than 2) times the driving power and outputting the converted driving power to a first output line;

a third step of converting the converted voltage of 1/N times the driving power to a level of the driving power and supplying the converted voltage to the electroluminescence display device through a second output line;

a fourth step of generating a first switching control signal to switch a switching device;

a fifth step of generating a second switching control signal synchronized with the first switching control signal; and a sixth step of converting a voltage from a voltage source into a square wave signal in accordance with the second switching control signal, wherein the second step includes the steps of:

storing the DC power at an inductor and supplying the stored energy to the first output line through a first diode connected between the inductor and the first output line by switching the switching device in accordance with the first switching control signal;

supplying the square wave signal generated in accordance with the second switching control signal to a first capacitor connected to the first output line, and supplying the voltage stored at the first capacitor to the first output line; and generating a voltage of 1/N times the driving power by use of an energy from the inductor and a voltage from the first capacitor supplied to the first output line.

16. The method according to claim 15, wherein the third step includes the steps of:

storing the voltage on the first output line to a second capacitor connected between the second output line and a ground voltage source through a second diode connected between the first and second output lines; and generating the driving power by use of the voltage on the first output line supplied through the second diode and the voltage stored at the second capacitor and supplying the generated driving power to the electroluminescence display device through the second output line.

17. The method for driving an electroluminescence display device to display a picture by use of a driving power from a power supply, comprising:

a first step of generating a DC power;

a second step of converting the DC power into a voltage of 1/N (provided that N is a positive integer of not less than 2) times the driving power and outputting the converted driving power to a first output line;

a third step of converting the converted voltage of 1/N times the driving power to a level of the driving power and supplying the converted voltage to the electroluminescence display device through a second output line;

a fourth step of generating a first switching control signal to switch a switching device;

a fifth step of generating a second switching control signal synchronized with the first switching control signal; and a sixth step of converting a voltage from a voltage source into a square wave signal in accordance with the second switching control signal, wherein the second step includes the steps of:

storing the square wave signal generated in accordance with the second switching control signal to a first capacitor connected to the first output line;

supplying the DC power to the first output line through a first diode connected between an input line of the DC power and the first output line; and generating a voltage of 1/N times the driving power by use of a voltage stored at the first capacitor and the DC power supplied through the first diode, and supplying the generated voltage of 1/N times the driving power to the first output line through a second diode connected between the first output line and the first capacitor.

18. The method according to claim 17, wherein the third step includes the steps of:

storing the voltage of 1/N times supplied from the first output line and storing the stored energy at a second capacitor connected between the second output line and a ground voltage source; and generating the driving power by use of the voltage stored at the second capacitor and the voltage from the first output line by switching the switching device in accordance with the first switching control signal and supplying the generated driving power to the electroluminescence display device.

* * * * *